(12) United States Patent
Böser et al.

(10) Patent No.: US 9,862,282 B2
(45) Date of Patent: Jan. 9, 2018

(54) DEVICE HAVING A WINDING CONFIGURATION AND SYSTEM, ESPECIALLY CHARGING STATION, FOR THE NON-CONTACT TRANSMISSION OF ENERGY TO AN ELECTRIC-POWERED VEHICLE, HAVING A WINDING CONFIGURATION

(71) Applicant: SEW-EURODRIVE GMBH & CO. KG, Bruchsal (DE)

(72) Inventors: Andreas Böser, Ubstadt-Weiher (DE); Thomas Krempel, Hambrücken (DE); Josef Schmidt, Graben-Neudorf (DE); Detlev Schroeder, Neulussheim (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 113 days.

(21) Appl. No.: 14/766,899

(22) PCT Filed: Jan. 24, 2014

(86) PCT No.: PCT/EP2014/000184
§ 371 (c)(1),
(2) Date: Aug. 10, 2015

(87) PCT Pub. No.: WO2014/121897
PCT Pub. Date: Aug. 14, 2014

(65) Prior Publication Data
US 2015/0367739 A1    Dec. 24, 2015

(30) Foreign Application Priority Data

Feb. 11, 2013  (DE) .................. 10 2013 002 226
Jun. 27, 2013  (DE) .................. 10 2013 010 695

(51) Int. Cl.
  H02J 17/00    (2006.01)
  H01F 38/14    (2006.01)
  (Continued)

(52) U.S. Cl.
  CPC ............ B60L 11/182 (2013.01); H01F 27/02 (2013.01); H01F 27/365 (2013.01); H01F 38/14 (2013.01);
  (Continued)

(58) Field of Classification Search
  CPC ...................................... B60L 11/182
  (Continued)

(56) References Cited

U.S. PATENT DOCUMENTS 6,060,977 A     5/2000  Yamamoto et al.
9,071,061 B2 *  6/2015  Boys ................. H02J 5/005
(Continued)

FOREIGN PATENT DOCUMENTS

CN       102870175 A    1/2013
DE    10 2006 025 460   12/2007
(Continued)

OTHER PUBLICATIONS

International Search Report, dated Sep. 24, 2014, issued in corresponding International Application No. PCT/EP2014/000184.
(Continued)

*Primary Examiner* — Samuel Berhanu
*Assistant Examiner* — Tessema Kebede
(74) *Attorney, Agent, or Firm* — Andrews Kurth Kenyon LLP

(57) ABSTRACT

A device having a winding configuration, especially a layer-type device having a winding configuration, the winding configuration being accommodated in a winding carrier, the winding carrier being situated between a cover part, particularly by which the winding carrier is covered, and a (Continued)

ferrite layer that has openings, especially gaps, the ferrite layer being mounted on a support that is situated on a base part, support domes being provided, especially being integrally molded and/or shaped, on the base part, which protrude through the openings in the ferrite layer and contact and/or support the winding carrier and/or the cover part.

19 Claims, 14 Drawing Sheets

(51) Int. Cl.
*H01F 27/02* (2006.01)
*B60L 11/18* (2006.01)
*H01F 27/36* (2006.01)

(52) U.S. Cl.
CPC ........ *Y02T 10/7005* (2013.01); *Y02T 10/7072* (2013.01); *Y02T 90/122* (2013.01); *Y02T 90/14* (2013.01)

(58) Field of Classification Search
USPC ............ 320/108; 307/104; 336/92, 199, 208
See application file for complete search history.

(56) References Cited

U.S. PATENT DOCUMENTS

| | | |
|---|---|---|
| 2010/0007215 A1 | 1/2010 | Sakuma |
| 2010/0097168 A1 | 4/2010 | Hahn et al. |
| 2011/0006611 A1 | 1/2011 | Baarman et al. |
| 2011/0101788 A1 | 5/2011 | Sun et al. |
| 2012/0091989 A1 | 4/2012 | Uramoto et al. |
| 2013/0181797 A1* | 7/2013 | Hickox .................. H01F 27/22 336/61 |
| 2013/0187255 A1 | 7/2013 | Wang et al. |
| 2013/0328412 A1 | 12/2013 | Meins et al. |

FOREIGN PATENT DOCUMENTS

| | | |
|---|---|---|
| DE | 10 2011 106 027 | 1/2013 |
| DE | 10 2011 107 620 | 1/2013 |
| EP | 2 172 952 | 4/2010 |
| GB | 2 492 824 | 1/2013 |
| GB | 2 492 825 | 1/2013 |
| JP | 09-65502 | 3/1997 |
| JP | 2003-045731 | 2/2003 |
| WO | 2013/000593 | 1/2013 |

OTHER PUBLICATIONS

International Preliminary Report on Patentability, dated Aug. 20, 2015, issued in corresponding International Application No. PCT/EP2014/000184.

* cited by examiner

DEVICE HAVING A WINDING CONFIGURATION AND SYSTEM, ESPECIALLY CHARGING STATION, FOR THE NON-CONTACT TRANSMISSION OF ENERGY TO AN ELECTRIC-POWERED VEHICLE, HAVING A WINDING CONFIGURATION

FIELD OF THE INVENTION

The present invention relates to a device having a winding configuration and a system, especially a charging station, for the non-contact transmission of energy to an electric-powered vehicle, having a winding configuration.

BACKGROUND INFORMATION

It is generally known that in the case of a flat winding, turns form a flat configuration, thus, are disposed in a winding area.

WO 2013/000593 A1 describes a flat coil for the non-contact, thus, contact-free transmission of energy.

SUMMARY

Therefore, the object of the present invention is to place a device having a winding configuration, in a protected manner.

Important features with regard to the device having a winding configuration, especially a layer-type device having a winding configuration, are that the winding configuration is accommodated in a winding carrier, the winding carrier being positioned between a cover part, especially by which the winding carrier is covered, and a ferrite layer that has openings, particularly gaps, the ferrite layer being mounted on a support, especially an aluminum support, particularly for the shielding of alternating magnetic fields, which is situated on a base part, support domes being provided, especially being integrally molded and or shaped, on the base part, which protrude through the openings in the ferrite layer and contact and/or support the winding carrier and/or the cover part.

The advantage in this context is that the weight force of a vehicle parking on the cover part is diverted from the ferrite layer, thus, is guided past the ferrite layer, because it is passed through the gaps in the ferrite layer.

In one advantageous development, the base part resting on the floor has a wall thickness or height which increases within the mounting surface on the floor from the outside toward the middle of the mounting surface, especially so that the base part has an arched shape and water flows off to the outside. This is advantageous because damage caused by water is avoidable, and even after the ingress of water or inundation, especially flooding of the floor, rapid drain-off is achievable.

In one advantageous refinement, the base part resting on a level floor is formed in mound-like fashion and/or has an arched structure, in particular, the maximum of the arched shape being centrally located in the base part. This is advantageous because it permits easy manufacture of the base part as an injection-molded part.

In one advantageous embodiment, the base part has the shape of a truncated pyramid. This is advantageous because it permits easy manufacture of the base part as an injection-molded part and/or the ferrite plates may easily be installed on the base part, thus, on the truncated pyramid, during manufacture.

In one advantageous refinement, the cover part is connected to the floor on which the base part rests, in particular, is screw-connected with the aid of screw anchors that are joined to the floor with form locking and/or force locking. This offers the advantage that it permits easy mounting.

In one advantageous development, the cover part is joined imperviously to the base part by pressing an edge section, thus, particularly a collar edge, of the cover part against the base part on an area going around at the outer edge of the base part, and deforming it. In so doing, in particular, the base part is pressed in the deformation area going around at the outer edge of the base part, against the floor. This is advantageous because great protective effect is attainable in an easy manner.

In one advantageous refinement, the winding wire of the winding configuration is clipped into corresponding depressions. The advantage here is that a simple installation technique is usable for the winding wire, and the winding wire is able to be held in position in an easy manner.

In one advantageous development, the base part has an opening, particularly a centrally located opening, in which an electronic component is placed, in particular, the winding-wire ends of the winding configuration being electrically connected to connection devices of the electronic component. The advantage in this case is that the electronic component is able to be protected easily and well.

In one advantageous embodiment, the openings, especially gaps, and support domes are disposed in an evenly-spaced, planar grid pattern, the grid pattern particularly being formed of mutually parallel rows set apart evenly from each other, the spacings within the respective row being uniform, and rows next-adjacent to each other in each instance having an offset relative to each other, in particular, the openings, especially gaps, and support domes each being rectangular. This offers the advantage that the support domes concentrate the acting forces upon themselves, and thus the ferrite layer is protected. Overall, therefore, the regularity of the grid pattern brings about a uniform force distribution, thus, a uniform loading of each support dome. Therefore, all support domes are loaded as equally as possible. In addition, the magnetic flux is only slightly hindered by the openings.

In one advantageous development, the winding configurations have cross-overs of winding wires, that are implemented and/or disposed in respective depressions in the carrier, thus, in the winding carrier, which rise monotonically from the outer edge toward the center, especially so that water is able to flow out from the inner area toward the outer edge. The advantage here is that the risk of electrical short-circuits is able to be reduced.

In one advantageous development, the ferrite layer is constructed essentially of homogeneous ferrite plates, especially in each case cuboidal ferrite plates, the ferrite plates being disposed in rows that are parallel to each other, with the ferrite plates in rows directly adjacent to each other having an offset, in particular, at least two ferrite plates being positioned between two gaps, in particular, shorter ferrite plates being usable at the end of the row in comparison to the homogeneous ferrite plates. This is advantageous because it permits a simple construction and an optimized surrounding edge.

In one advantageous development, the carrier and base part are realized in one piece, thus, as one part. This is advantageous because fewer parts are necessary.

In one advantageous embodiment, the winding configuration has part-windings, one turn of a second part-winding being assigned to each turn of a first part-winding, between each turn of the first part-winding and the turn of the first part-winding following it, an intermediate area being enclosed which is equal to the intermediate area enclosed between the two respective assigned turns of the second part-winding, in each instance, the area enclosed by the turn of the first part-winding being equal to the area enclosed by the respective assigned turn of the second part-winding, in particular, each turn of the first part-winding having a number of cross-overs with the assigned turn of the second part-winding. The advantage here is that with the aid of the cross-overs, the turns of the part-winding corresponding to one other each have the same wrapped-around area, and thus the part-windings exhibit the same inductance. In this context, the turns corresponding to one another are understood to be those turns of each part-winding that have the same ordinal number. For example, the respective first turns of each part-winding, thus, the turns which have the smallest wrapped area, therefore correspond to each other. In the same way, the two second turns of the two part-windings correspond to each other and have the second-smallest wrapped area. Likewise, the respective last turns of the two part-windings correspond to each other, and in each case have the largest wrapped area, which in each instance has the same area value.

In one advantageous refinement, this intermediate area, thus, area difference, has two portions, the first portion being located on the longitudinal sides and the other portion on the transverse sides of the respective turn, in particular, given a rectangular implementation of each turn, this area difference thus being split up uniformly in the transverse direction and uniformly in the longitudinal direction, in this context, the ratio of the portions corresponding especially to the ratio of length to width of the rectangle. This is advantageous because it permits a uniform distribution, and thus the most homogeneous field-strength distribution possible is attainable along the area wrapped around by the winding configuration.

In one advantageous embodiment, the winding configuration of the device has part-windings, one turn of a second part-winding being assigned to each turn of a first part-winding, between each turn of the first part-winding and the turn of the first part-winding following it, an area being enclosed which is equal to the area enclosed between the two respective assigned turns of the second part-winding, in each case the area enclosed by the turn of the first part-winding being equal to the area enclosed by the respective assigned turn of the second part-winding, in particular, each turn of the first part-winding having a number of cross-overs with the assigned turn of the second part-winding. The advantage here is that the areas enclosed by the respective turns assigned to each other are equal. This also holds true for the directly following turn of each part-winding, thus, in each instance, the next turn in the winding. However, the area difference between the turn and the turn following it is also equal in the two part-windings.

In one advantageous embodiment, this area difference has two portions, the first portion being located on the longitudinal sides and the other portion being located on the transverse sides. Given an essentially rectangular implementation of each turn, this area difference is thus split up uniformly in the transverse direction and uniformly in the longitudinal direction, which leads to an especially homogeneous magnetic-field-strength distribution. In this context, the ratio of the portions corresponds to the ratio of length to width of the rectangle.

In one advantageous embodiment, the winding configuration has part-windings, one turn of a second part-winding being assigned to each turn of a first part-winding, each turn of the first part-winding having a number of cross-overs with the assigned turn of the second part-winding, in particular, in each case the area wrapped around by the turn of the first part-winding being equal to the area wrapped around by the respective assigned turn of the second part-winding. The advantage here is that in spite of the implementation as a flat winding, with the aid of the cross-overs, it is practicable for the areas wrapped around in each case by the part-windings to be equal. Consequently, the inductances of the part-windings able to be connected in parallel are of equal value and the currents are identical, and thus the magnetic field is homogeneous.

A metallic foreign body, which is located in the magnetic field generated by the winding, is heated up as a result of eddy currents and their ohmic losses. At the same time, because of the homogeneity of the magnetic field, the temperature is independent of the winding-area position. Thus, to transmit energy to a secondary winding driven over the flat winding, a maximum current is able to be injected into the winding configuration, so that although a predefined peak temperature of the foreign body is not exceeded, a maximum power is able to be transmitted.

A further advantage in the case of the coil according to the present invention is that, because of the symmetrical construction of the two part-windings, a position differing from the central position of an electric-powered vehicle having a secondary winding over the winding configuration, thus, a deviation from the position of strongest interface between the winding configuration and the secondary winding, is easily recognizable by detecting the respective current in the two part-windings, for because of the offset of the secondary coil and primary coil, inductances are generated that are of different magnitude in the part-windings. Thus, if the vehicle has been parked too far forward, the current in the first part-winding is greater than the current in the second part-winding. If the vehicle was parked too far to the rear, the current in the first part-winding is less than the current in the second part-winding.

In one advantageous refinement, the number of cross-overs is even. The advantage here is that a symmetrical configuration is producible in an easy manner.

In one advantageous development, prior to a cross-over, the winding wire of the specific turn of the first part-winding runs inside of, and after the cross-over, outside of the respective assigned turn of the second part-winding or prior to a cross-over, the winding wire of the specific turn of the first part-winding runs outside of, and after the cross-over, inside of the respective assigned turn of the second part-winding. The advantage is that with the aid of the cross-over, a symmetrical winding configuration may be produced in an easy manner.

In one advantageous embodiment, the crossovers are set apart from each other at regular intervals in the direction of turn of a respective turn of the first and/or second part-winding. The advantage here is that a symmetrical winding configuration is again producible in an easy manner.

In one advantageous development, the distance between one specific turn of the first part-winding and the respective assigned turn of the second part-winding is constant. This is advantageous because as large an area as possible is able to be provided for the winding configuration, and in addition, as homogeneous a magnetic field as possible is able to be produced.

In one advantageous refinement, the part-windings are electrically connected in parallel to each other. This offers the advantage that uniform energizing is attainable, and thus the most homogeneous magnetic field possible.

In one advantageous embodiment, the part-windings are each flat windings, in particular, the flat winding in each case being disposed within a winding area, the winding area running especially in curved fashion. The advantage in this case is that water is able to drain off from the middle of the winding if the area is convexly curved, thus, descends from the middle of the coil to the edge of the coil. Even if the winding is covered by a housing part of constant wall thickness, e.g., a cover part, this advantage of the water runoff is retained. In this context, the maximum of the winding area is located at the top in the gravitational field, and the edge of the wound area at the bottom.

In one advantageous refinement, with the exception of the regions of the cross-over and/or the regions where the winding-wire end areas are brought out, the part-windings are flat windings. This is advantageous because it permits easy manufacture.

In one advantageous development, litz wire is used as winding wire, in particular, the litz wire taking the form of a bundle of individual wires electrically insulated from each other, in particular, the litz wire being round litz wire, the bundle therefore especially having essentially a round cross-section. This is advantageous because a simple and inexpensive winding wire may be utilized. By using an insulated cladding, it is possible to ensure that the winding and electronic equipment are weather-resistant.

Important features with regard to the system, especially charging station, for the non-contact transmission of energy to an electric-powered vehicle, having a winding configuration indicated above, are that an alternating current from an alternating-current source is injected into the parallel-connected part-windings, the vehicle on its bottom side having a secondary winding, which is able to be coupled inductively to the winding configuration. The advantage in this context is that energy is transmittable in non-contact manner, and because of the homogeneous magnetic-field-strength distribution, the inductive coupling strength is only slightly dependent on displacements of the vehicle.

Further advantages are derived from the dependent claims. The present invention is not limited to the combination of features in the claims. Further useful combination possibilities of claims and/or individual claim features and/or features of the specification and/or of the figures are apparent to one skilled in the art, particularly from the problem definition and/or the objective set by comparison to the related art.

DETAILED DESCRIPTION

Figure 1:
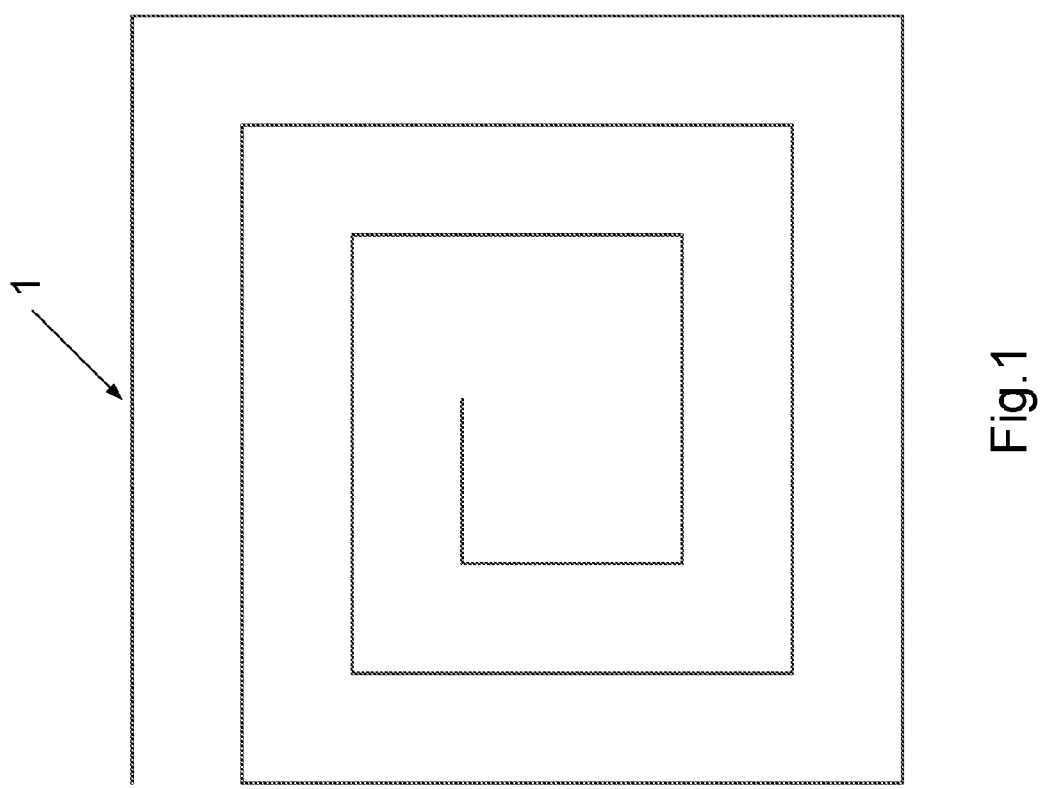
FIG. 1 shows a spiral-shaped flat winding, especially made of round litz wire, the winding wire being made up of a bundle of individual wires electrically insulated from each other.

FIG. 1 shows a spiral-shaped flat winding, especially made of round litz wire, winding wire 1 being made up of a bundle of individual wires electrically insulated from each other, thus, HF litz wire.

Figure 2:
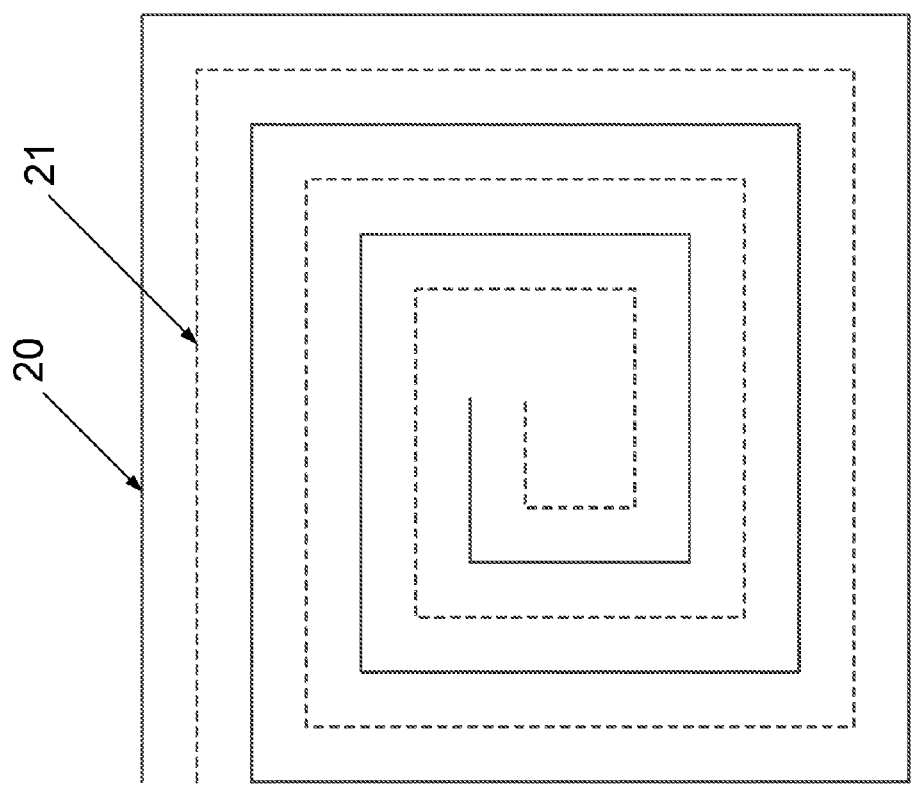
FIG. 2 shows a spiral-shaped flat winding able to be assembled from two part-windings, the part-windings being set apart from each other.

FIG. 2 shows a spiral-shaped flat winding able to be assembled from two part-windings, the part-windings being set apart from each other. Winding wire 20 of the first part-winding is shown with a solid line and winding wire 21 of the second part-winding is shown with a dashed line.

Figure 3:
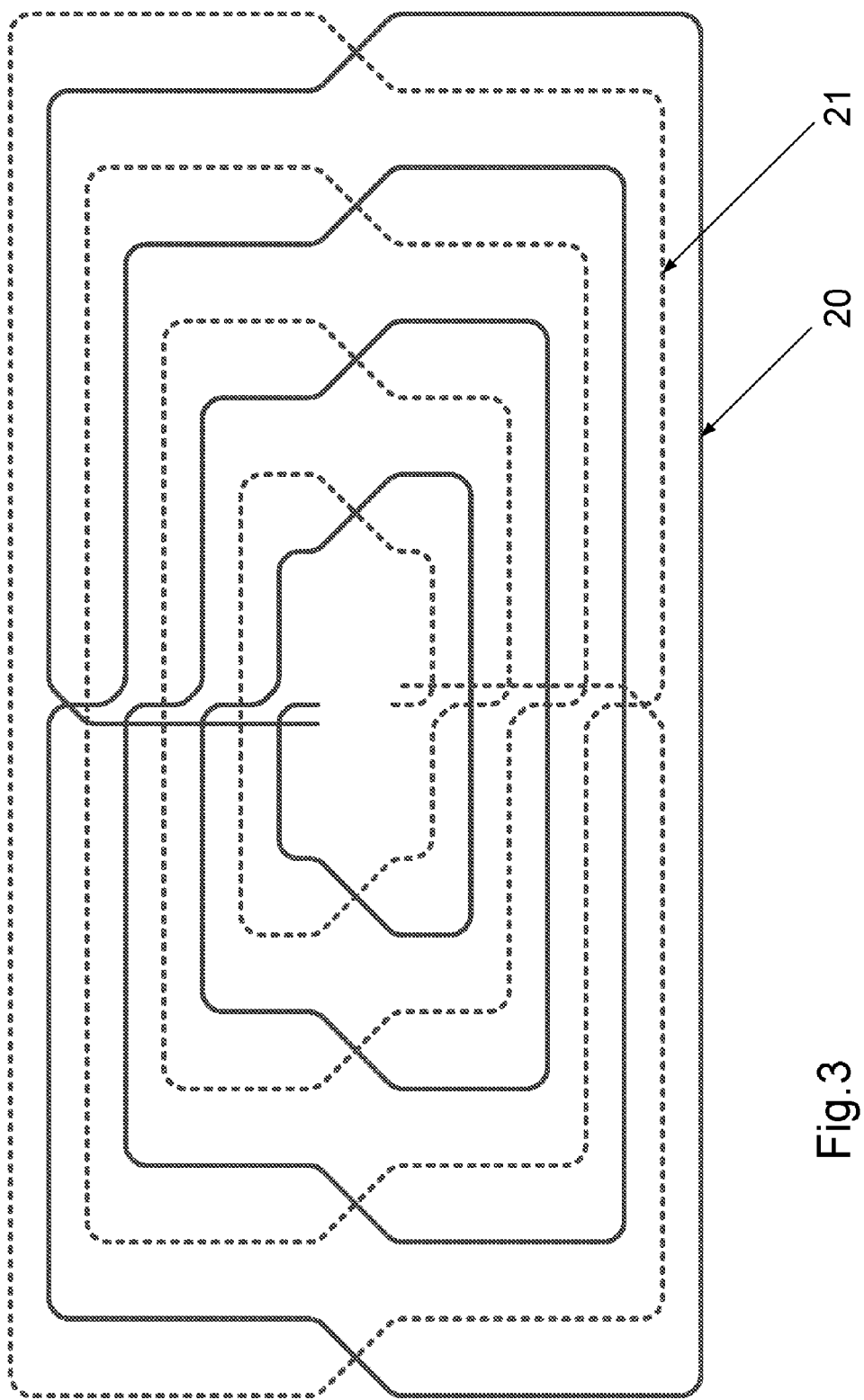
FIG. 3 shows schematically a winding configuration according to the present invention, which is realized as a spiral-shaped flat winding.
Figure 4:
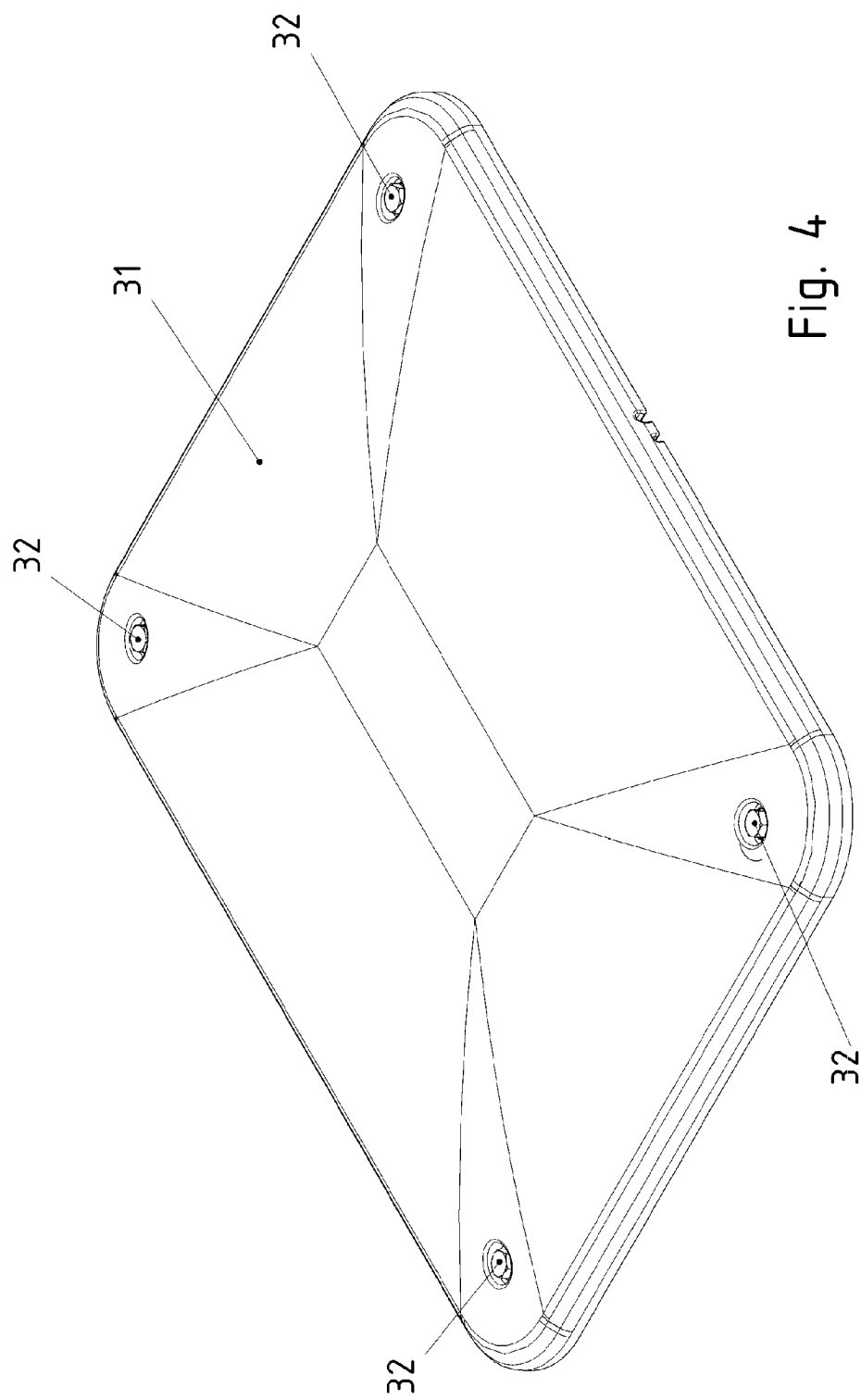
FIG. 4 shows a steady-state part of the charging station for electric-powered vehicles in an oblique view.
Figure 5:
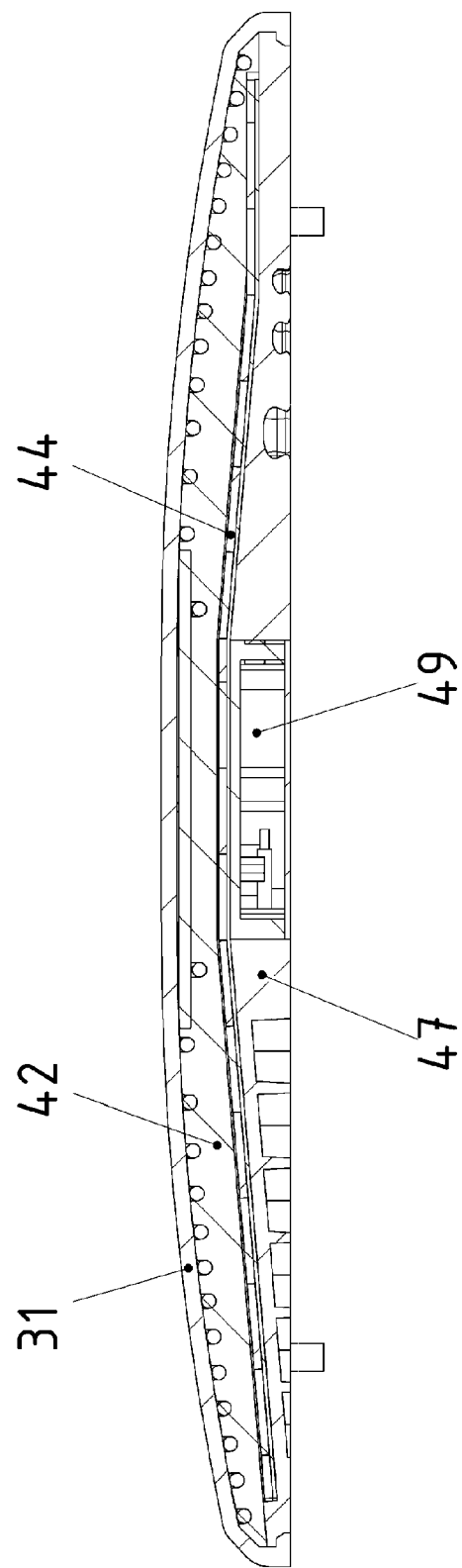
FIG. 5 shows an associated cross-section.
Figure 6:
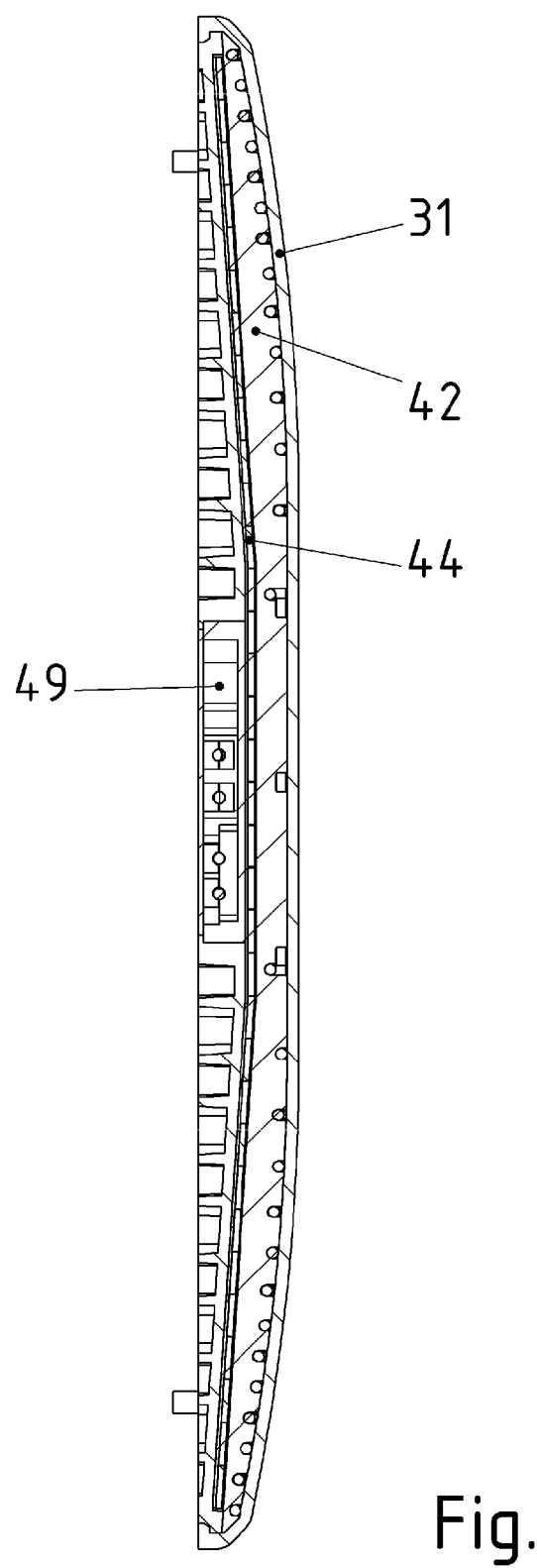
FIG. 6 shows an associated longitudinal section.
Figure 7:
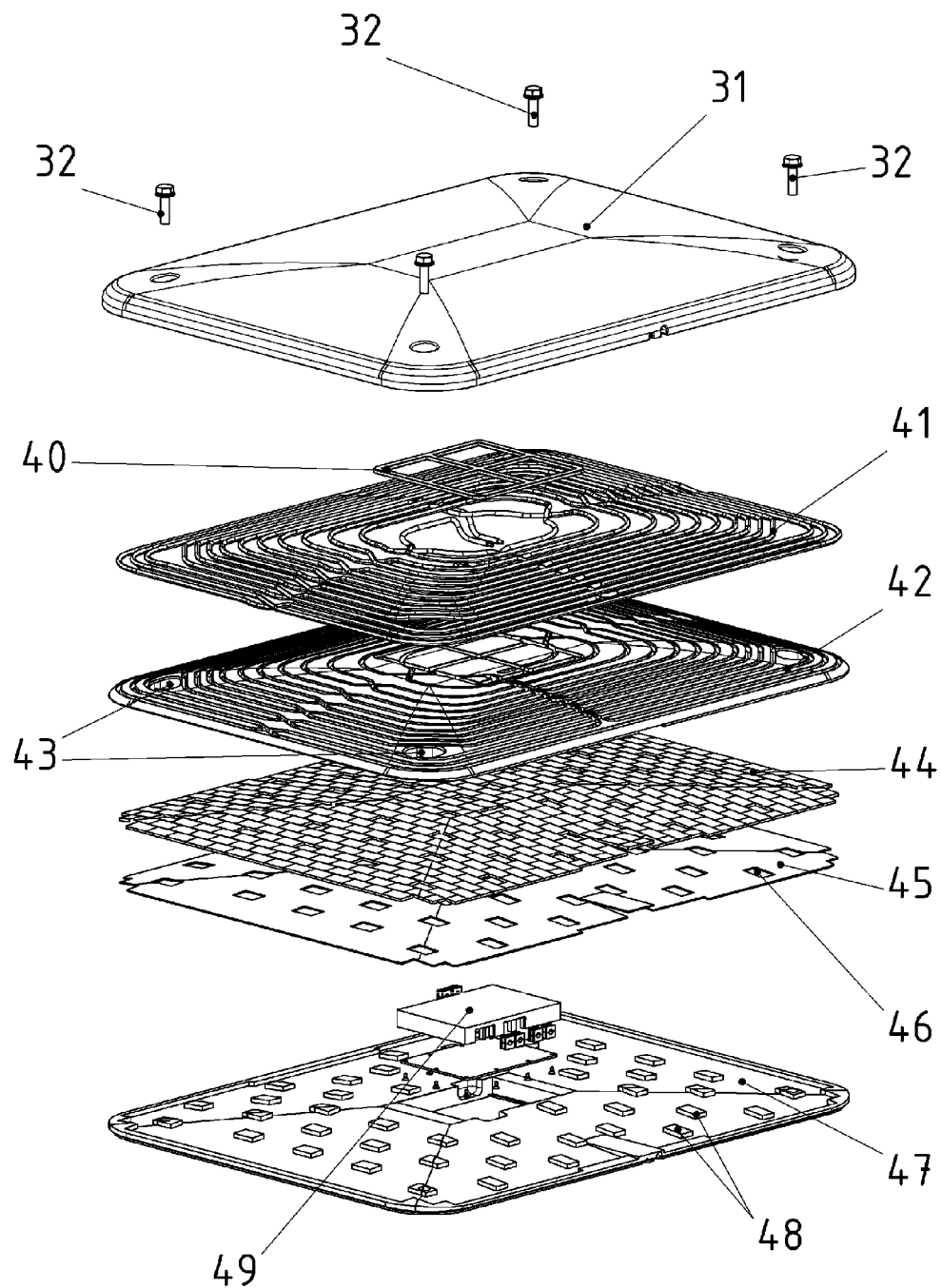
FIG. 7 shows the steady-state part in an exploded view.
Figure 8:
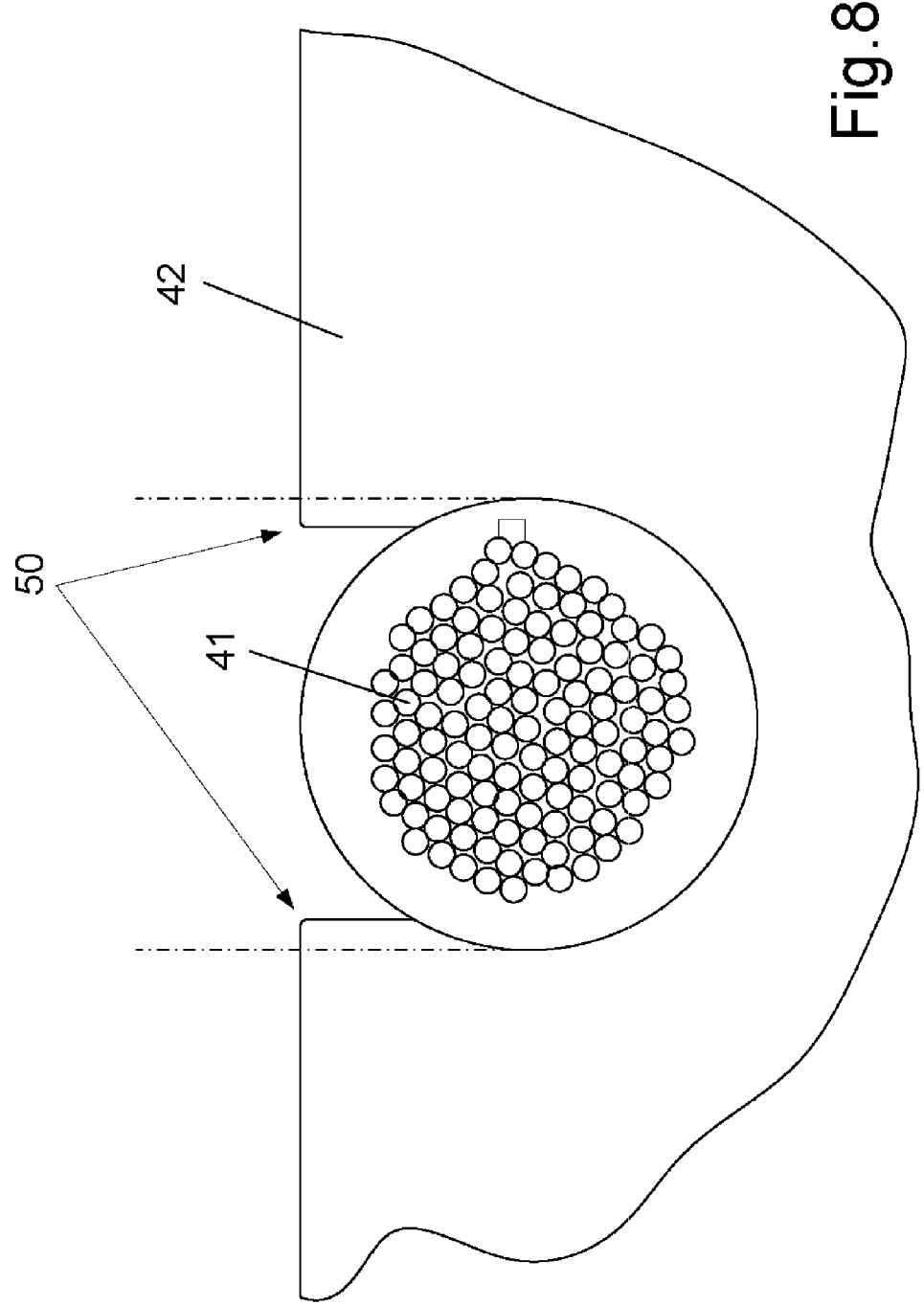
FIG. 8 shows the accommodation of primary conductor 41 in winding carrier 42 with the aid of undercut 50.
Figure 9:
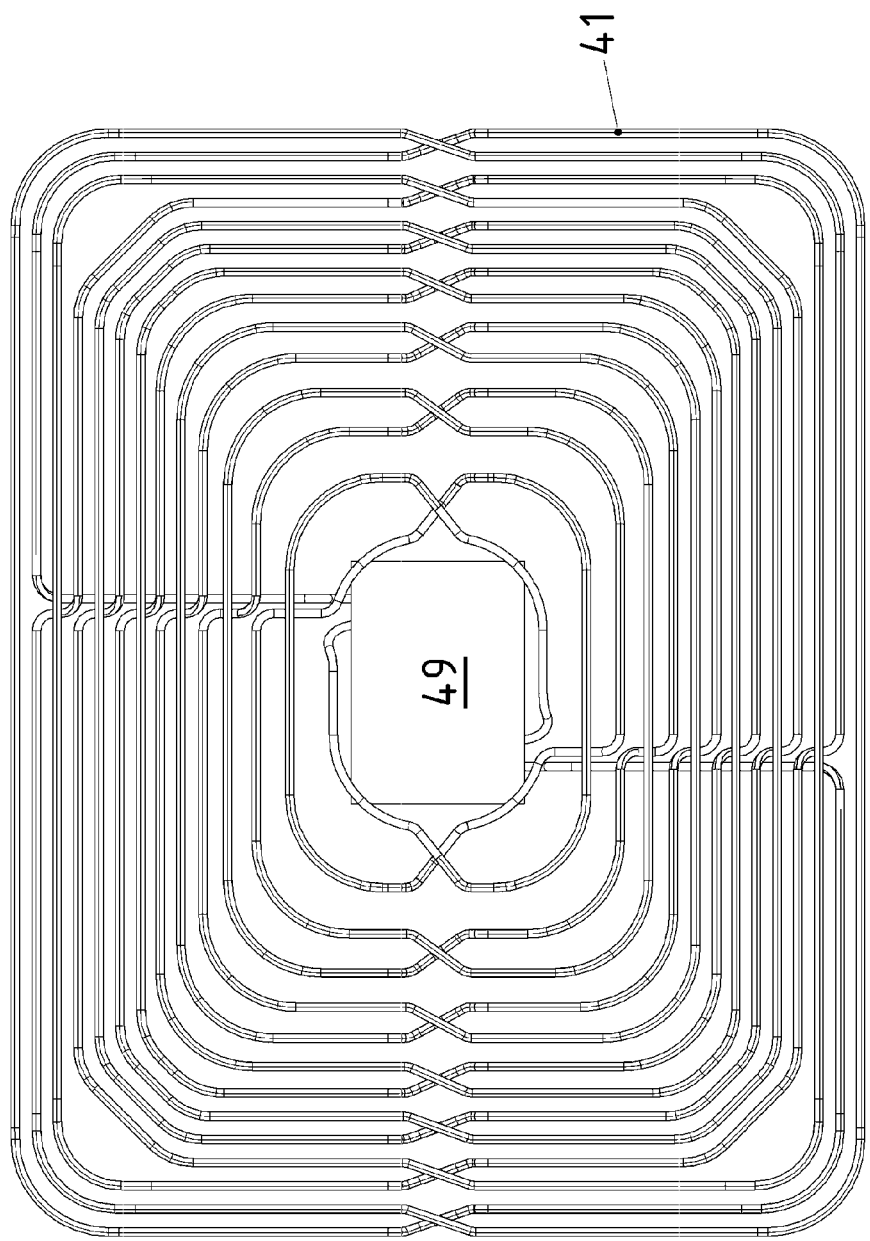
FIG. 9 shows winding configuration 41 in a plan view.
Figure 10:
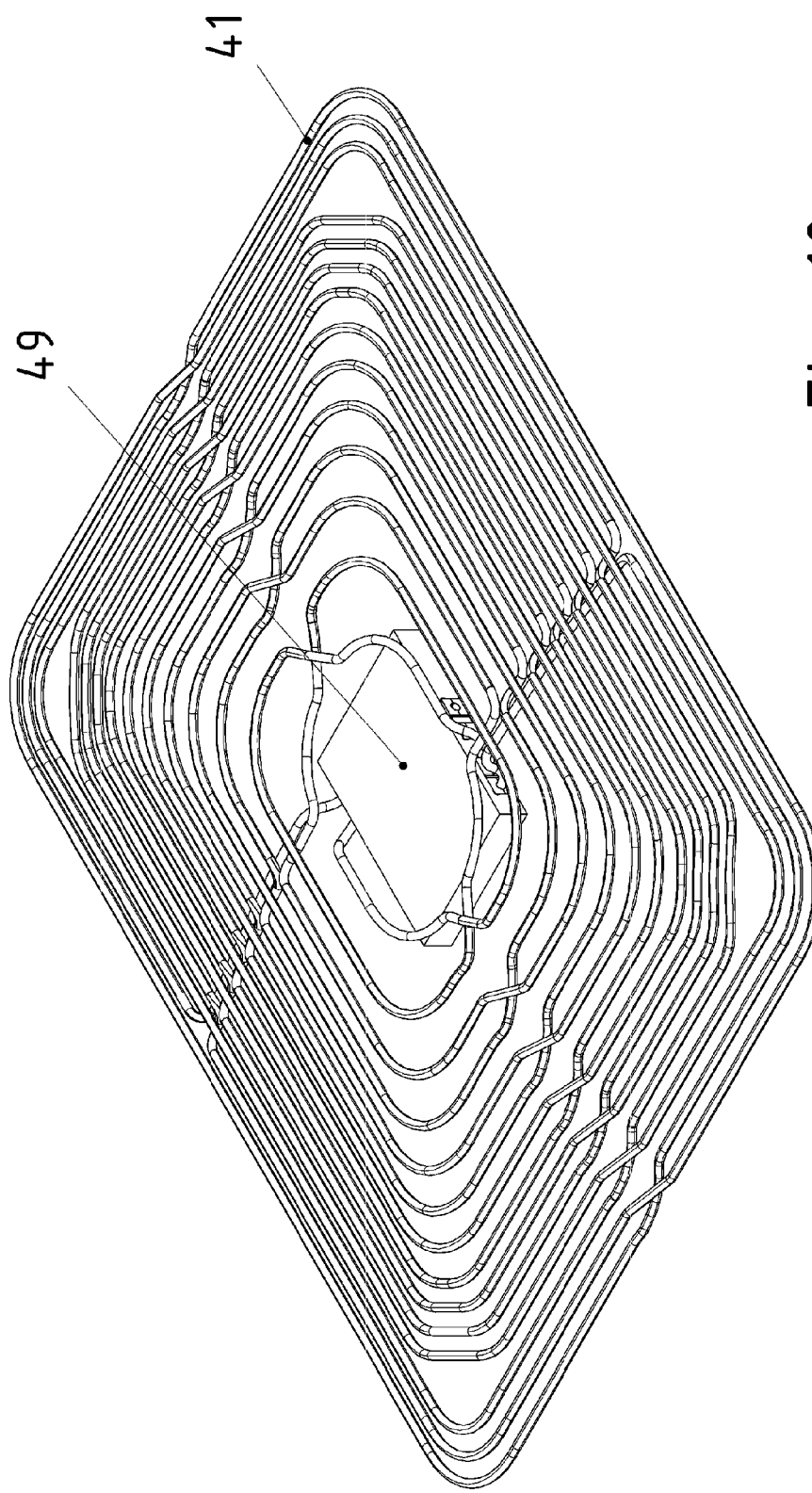
FIG. 10 shows winding configuration 41 in an oblique view.
Figure 11:
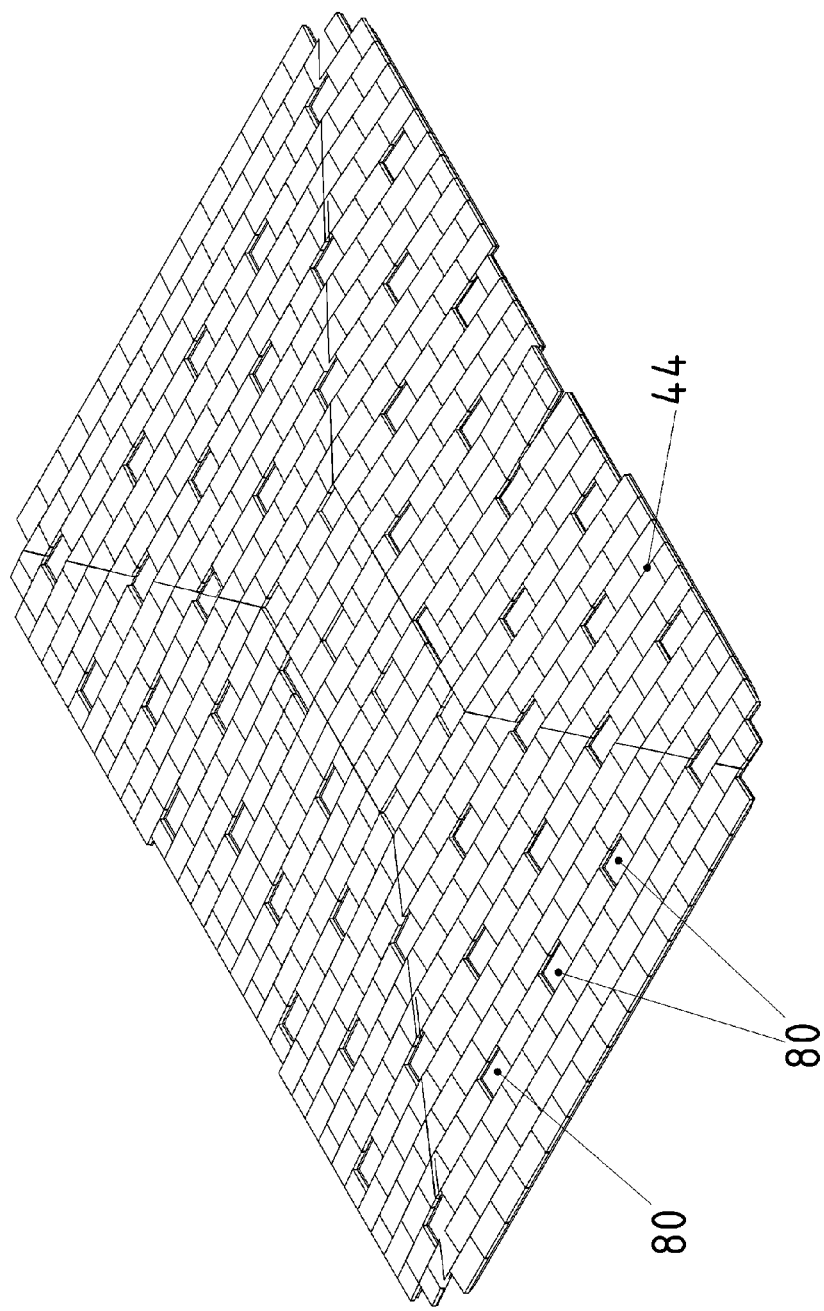
FIG. 11 shows ferrite-plate layer 44 having gaps, thus, openings, 80.
Figure 12:
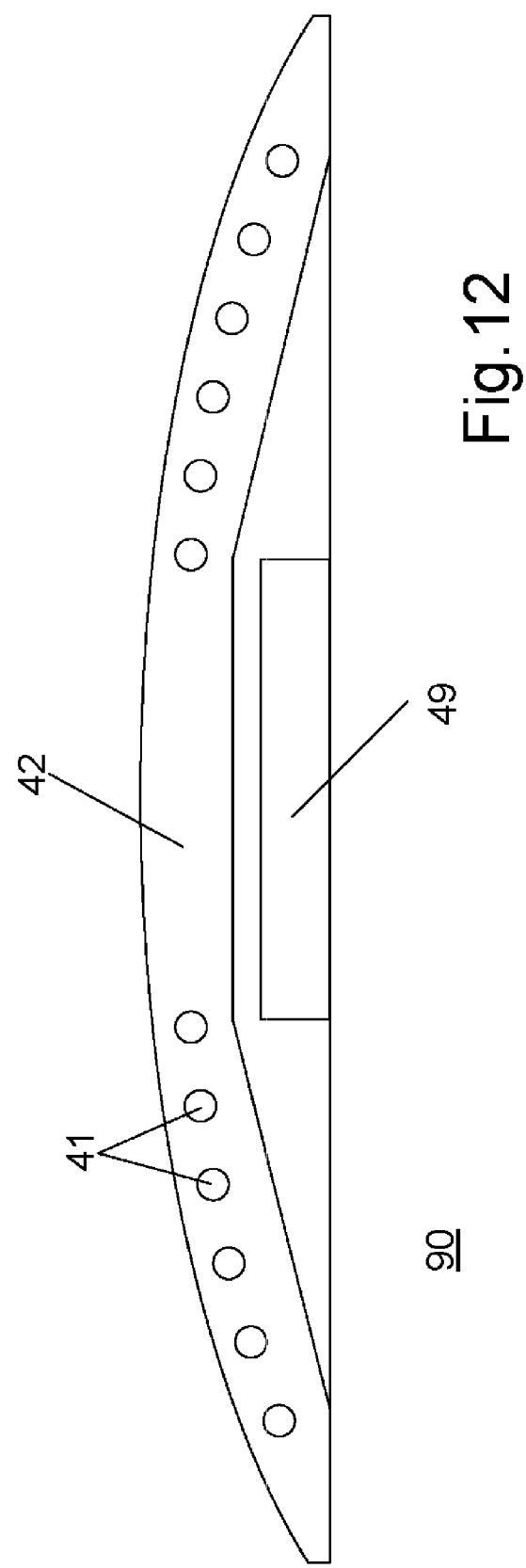
FIG. 12 shows the schematic construction of the steady-state part, so that it is clear that it is situated on floor area 90 and has an arched upper surface, an electronic component 49 being mounted in protected manner in the interior.
Figure 13:
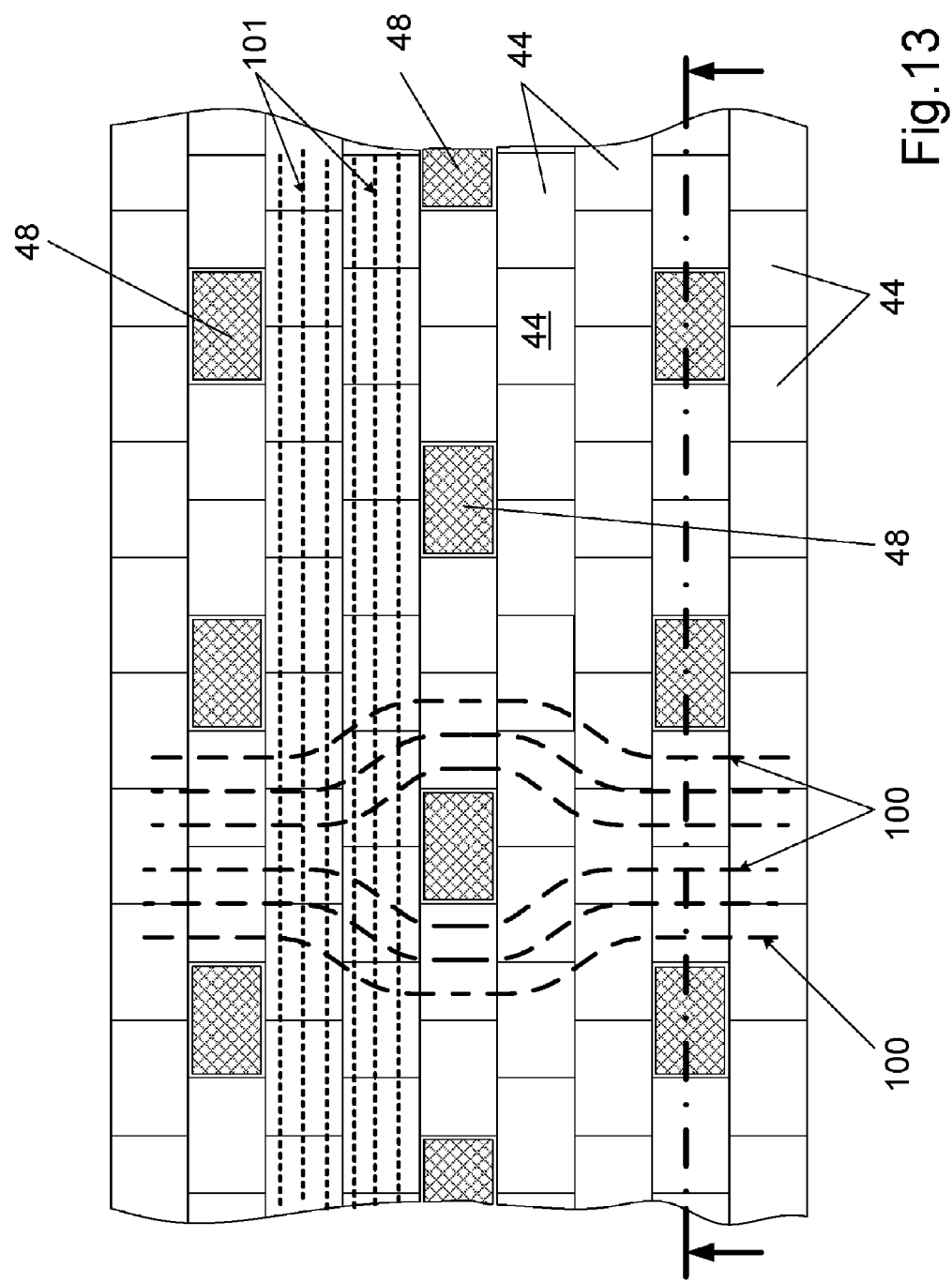
FIG. 13 shows the magnetic flux within ferrite-plate layer 44 by way of example for two variants, in which either field lines 101 are able to propagate straight and undisturbed in the longitudinal direction, or field lines 100 in the transverse direction must flow around openings 80 filled with plastic support domes 48. Thus, it is made clear that the magnetic flux is able to propagate in both directions without special obstacles. At the same time, it is also shown that support domes 48 are disposed at regular intervals within ferrite-plate layer 44, and thus form a plane grid that is made of mutually parallel rows set apart uniformly from each other, which are implemented homogeneously, and along which in each case support domes 48 are set apart from each other at regular intervals with a first grid constant, directly adjacent rows having an offset in the row direction, especially by one-half first grid-constant value. Ferrite plates 44 are all identical and are likewise disposed in rows having an offset relative to the row directly adjacent in each instance. All rows indicated are straight.
Figure 14:
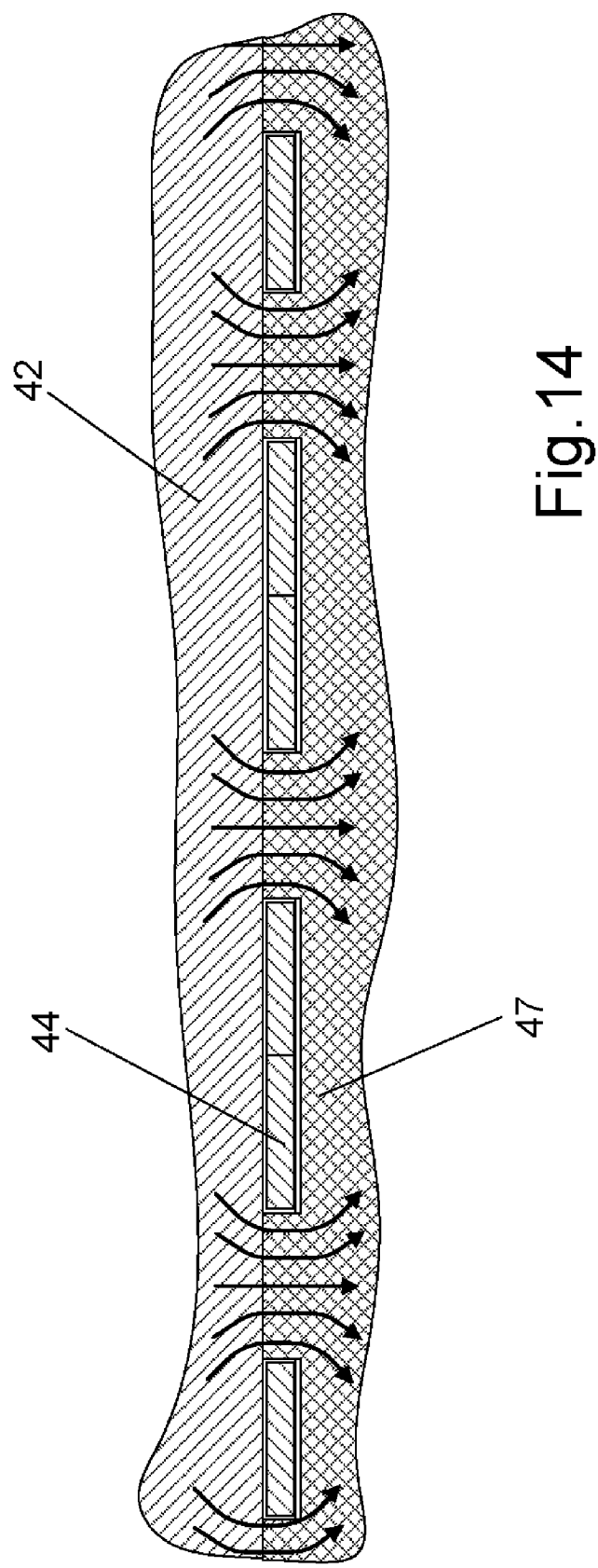
FIG. 14 shows a schematic intersection that illustrates the lines of force generated by a vehicle parked on the steady-state part, in which it becomes clear that ferrite plates 44 are not stressed, because the lines of force are redirected by support domes 48.

FIG. 3 shows a spiral-shaped flat winding according to the present invention.

As shown in FIG. 1, a flat winding, thus, a quasi two-dimensional winding, is able to be realized in a rectangular/spiral shape, in which between the respective adjacent turns of the winding, a distance is provided that is greater than the diameter of the winding wire. Therefore, each turn is set apart outwardly, thus especially radially, from the preceding turn. The distance amounts to a multiple of the winding-wire diameter, the distance value increasing monotonically, especially strictly monotonically, from the outer coil edge to the middle of the coil. For example, the term multiple means threefold or a multifold. The distance between successive turns of the respective part-winding thus increases from the outside to the inside, because the area enclosed between two successive turns of the respective part-winding in each case has the same value.

Round litz wire is used as winding wire. The spatial extension of this litz wire is therefore not insignificant, and the magnetic field generated by the winding is less homogeneous in the area of the winding wire of each turn than in the area between the turns.

As shown in FIG. 2, by realizing the winding using two part-windings 20, 21, a more homogeneous magnetic-field-strength distribution is attainable over the wound area, and half as great a distance, however twice as much winding wire having to be used, because in the region of the winding wire of the turn of a first part-winding, the other part-winding generates a more homogeneous magnetic-field-strength distribution than the first part-winding. However, the other part-winding runs constantly within the first part-winding, which means the inductance of the part-windings is different.

As shown in FIG. 3, using the part-windings provided according to FIG. 2, cross-overs of the winding wires of the two part-windings are additionally provided in the present invention. In this context, the winding wires are electrically insulated from each other, and a very homogeneous magnetic field is obtained over the winding area. In addition, the two part-windings have the same inductance.

Two cross-overs are assigned to each complete turn. Thus, the winding wire of one turn of a part-winding runs for one half turn inside of, and for the other half turn outside of the corresponding turn of the other part-winding.

With the exception of the cross-over regions and the lead-through regions where the winding-wire end areas are brought out and/or corner regions, a constant spacing exists. The turn form—thus, the shape of the turn—of turns of the part-windings corresponding to each other are symmetrical relative to each other, in particular, are symmetrical relative to a plane that is perpendicular to the winding plane and intersects the cross-over regions.

In the region where, in particular, the winding wire of each part-winding is brought out radially, the winding wire of each turn of the associated first part-winding is led in steplike fashion, thus, almost abruptly, to a radial distance that is greater in each instance. The increase of the radial distance in each case is very great in this region, especially greater than along the winding wire before or after the region.

Although the part-windings are able to be disposed in the same plane, an expansion of the winding room perpendicular to this plane is necessary in the cross-over region. The equivalent holds true for the region of the lead-in and the end lead.

Alternatively, the two part-windings are disposed in two planes that are parallel to, but set apart from each other.

The two part-windings are connected electrically in parallel, so that the injected alternating current is distributed uniformly in both part-windings. Even when injecting a mid-frequency alternating current, a uniform distribution is achievable because of the equality of the inductances.

The frequency of the injected alternating current lies preferably between 10 kHz and 1 MHz.

The winding is able to be positioned on the floor, so that a vehicle having a secondary winding secured to it may be driven over the flat winding, and due to the inductive coupling of the secondary winding to the primary winding configuration, particularly thus to the flat winding as primary winding, energy is transmittable in non-contact, especially also in galvanically isolated manner.

In a further exemplary embodiment according to the present invention, instead of the respective plane for the winding, an area is used which is three-dimensionally curved.

In another exemplary embodiment according to the present invention, instead of the two cross-overs per turn, 2*n cross-overs are implemented, especially set apart uniformly from each other in the direction of turn, and/or instead of two part-windings, a plurality of parallel-connected part-windings are used. In this context, n is a whole number. The wrapped-around areas of the respective part-windings are likewise identical in this case.

As shown in FIGS. 4 through 7, the steady-state part of the charging station, thus, the primary-winding configuration, is covered by a cover part 31, which preferably is made of aluminum or plastic and which is screwed by screws 32 in a threaded bore in the foundation or in an anchor secured in the foundation.

Cover part 31, made preferably of aluminum or plastic, thus protects primary-conductor winding configuration 41 situated under it, as well as a frame antenna 40 for data transmission.

Primary-conductor winding configuration 41 is provided in a winding carrier 42 that has an undercut 50 for accommodating the primary conductor, so that primary conductor 41 is able to be clipped in, especially into corresponding slots or grooves.

Winding carrier 42 is mounted on a layer of rectangular ferrite plates 44, which are disposed, especially glued, on a support 45.

Support 45 is preferably made of aluminum as magnetic screening.

Support 45 and the layer of ferrite plates 44 have rectangular gaps, thus openings 46, which are congruent. In this context, the shape of the respective gap corresponds to one ferrite plate.

Base part 47 has rectangular support domes 48 which protrude through openings 46 in support 45 and gaps 80 in ferrite-plate layer 44. Preferably there is an air gap between support domes 48 and ferrite-plate layer 44 to compensate for thermally caused changes in length.

In this way, in response to the application of a weight-force component of a vehicle located, especially parked, at least partially on cover part 31, this component is passed on from cover part 31 to winding carrier 42, without the winding wire of the winding configuration becoming deformed. To be sure, this winding wire is made of HF litz wire, especially round litz wire, thus, a bundle of individual single wires electrically insulated from each other; however, with the aid of an undercut 50, the winding wire is accommodated with form locking in a cutout in winding carrier 42 housing the wire. This cutout has a larger cross-sectional area than the winding wire, so that even if winding carrier 46 becomes deformed under the influence of the force component, the winding wire is not subject to any action of force, and no deformation of the winding wire, especially of the cross-section of the winding wire, takes place.

The force component is then passed on from winding carrier 42 via support domes 48 of base part 47 to floor area 90.

Since support domes 48 protrude through openings 46 and through gaps 80, the force component is also guided past ferrite-plate layer 44. Thus, the brittle material of ferrite plates 44 is not stressed.

The respective end areas of the winding wire are brought to electronic component 49 and are electrically connected there to the circuitry of electronic component 49 with the aid of connecting devices, especially connecting terminals. In the same way, the frame antenna is also connected to the electronic component, and in this way, permits the transmission of signals to the secondary winding of the vehicle.

Base part 47 is convexly curved, so that water drains off. A truncated pyramid may be used here for easy manufacture. Because of the convexity, a spatial area is also able to be protected, that permits the accommodation of electronic component 49.

The winding configuration has two part-windings, whose winding wires intersect at several locations. A portion of the cross-over locations are disposed in one line that runs from inside to the outside, thus from the interior housing electronic component 49 outwardly, therefore toward the outer periphery of base part 47. Carrier 42, thus, especially the winding carrier, has correspondingly-running depressions in which the cross-overs are accommodated. These depressions therefore also permit water to drain away, because the depressions are wide enough that water is also able to run off around the cross-overs in the respective depression.

The ferrite-plate layer is made up of ferrite plates 44 lined up one after the other in rows, the ferrite plates 44 of each two rows directly adjacent to one another having an offset relative to each other. At the end of the rows, ferrite plates which are half as long are used at the end areas of each second row in comparison to the otherwise homogeneous ferrite plates 44. The offset corresponds essentially to one-half plate length.

Gaps 80 for the passage of support domes 48 are far enough away from each other that at least two ferrite plates 44 are able to be situated in between. The shape of respective gap 80 corresponds to one of homogeneous ferrite plates 44.

In another exemplary embodiment according to the present invention, instead of the two cross-overs per turn, 2*n cross-overs are implemented, especially set apart uniformly from each other in the direction of turn, and/or, instead of two part-windings, a plurality of parallel-connected part-windings are used. In this context, n is a whole number. The wrapped-around areas of the respective part-windings are likewise identical in this case.

LIST OF REFERENCE NUMERALS

1 Winding wire
20 Winding wire of the first part-winding
21 Winding wire of the second part-winding
31 Cover part
32 Screw
40 Frame antenna for data transmission
41 Primary-conductor winding configuration
42 Winding carrier
43 Opening for screw 2
44 Ferrite plates
45 Support for ferrite plates 44
46 Opening
47 Base part
48 Support dome
49 Electronic component
50 Undercut
80 Gap, opening
90 Floor area
100 Field line, optional
101 Field line, optional

What is claimed is:

1. A device, comprising:
   a cover part;
   a winding carrier;
   a winding configuration accommodated in the winding carrier;
   a ferrite layer including openings;
   a support;
   a base part; and
   support domes formed in one piece on the base part, wherein:
      the support domes protrude through the openings in the ferrite layer and support at least one of the winding carrier and the cover part,
      the winding carrier is disposed between the cover part and the ferrite layer, and
      the ferrite layer is mounted on the support that is situated on the base part.

2. The device as recited in claim 1, wherein:
   the device is a primary-winding configuration,
   the support is a support layer,
   the openings are gaps, and
   the winding carrier is disposed between the cover part and the ferrite layer by that part of the cover part by which the winding carrier is covered,
   the support domes are one of integrally molded and shaped.

3. The device as recited in claim 1, wherein the cover part, the winding carrier, the support, and the base part are made of electrically insulating material.

4. The device as recited in claim 1, wherein at least one of:
   the base part is able to be placed on a floor and has a wall thickness which increases within a mounting surface on the floor from an outside toward a middle of the mounting surface,
   the base part resting on a level floor at least one of is mound-like and has an arched structure, and
   the base part has a shape of a truncated pyramid.

5. The device as recited in claim 4, wherein at least one of:
   the floor is a level, horizontally extending floor area,
   the wall thickness includes one of a vertical thickness and a vertical height,
   the base part has an arched shape and water is able to drain off toward the outside, and
   a maximum of the arched shape, corresponding to a maximum vertical height above the floor, is centrally located in the base part.

6. The device as recited in claim 1, wherein at least one of:
   the cover part is screw-connected with the aid of screw anchors joined to the floor with at least one of a form-locking and force-locking to the floor on which the base part rests,
   the cover part is joined imperviously to the base part by pressing an edge section, corresponding to a collar edge, of the cover part onto the base part, including by pressing on an area going around at an outer edge of the base part, and deforming the base part, and
   a deformation area of the base part going around at the outer edge of the base part is pressed against the floor by at least one of the screw anchors and a weight force of the base part.

7. The device as recited in claim 1, wherein the winding wire of the winding configuration is joined to the winding carrier by being clipped into corresponding depressions in the winding carrier.

8. The device as recited in claim 1, wherein:
   the base part has a centrally located opening in which an electronic component is placed, winding-wire ends of the winding configuration are connected electrically to connection devices of the electronic component, and the opening is through-going at least one of parallel to an extension direction of the support domes and vertically to the extension direction.

9. The device as recited in claim 1, wherein:

the openings and the support domes are disposed in an evenly-spaced, planar grid pattern, the grid pattern is formed of mutually parallel rows set apart evenly from each other, a spacing within the respective row being uniform, a distance to the next-adjacent opening in the row corresponding in each case to a grid constant, rows next-adjacent to each other in each instance having an offset, in an extension direction of the row, of one-half grid constant relative to each other, and the openings and the support domes are rectangular.

10. The device as recited in claim 1, wherein:

the winding configuration has cross-overs of winding wires that are at least one of implemented and disposed in respective depressions in the winding carrier, and a vertical level of the depressions rises monotonically from an outer edge of the winding carrier toward a center, so that water penetrating into the device is able to drain off from an inner area toward the outer edge.

11. The device as recited in claim 1, wherein:

the ferrite layer is constructed essentially of homogeneous, cuboidal ferrite plates, the ferrite plates are disposed in rows that are parallel to each other, with the ferrite plates in rows directly adjacent to each other having an offset, at least two ferrite plates are situated between each two gaps for a passage of the support domes, and shorter ferrite plates are located at an end of the row in comparison to the homogeneous ferrite plates.

12. The device as recited in claim 1, wherein the winding carrier and the base part are realized in one piece.

13. The device as recited in claim 1, wherein:

the winding configuration has part-windings, one turn of a second part-winding is assignable to each turn of a first part-winding in such a way that between each turn of the first part-winding and a turn of the first part-winding following it, an intermediate area and an area difference are enclosed which is equal to the intermediate area enclosed between the two respective assigned turns of the second part-winding, the area enclosed by the turn of the first part-winding in each instance being equal to the area enclosed by the respective assigned turn of the second part-winding, and each turn of the first part-winding has a number of cross-overs with the assigned turn of the second part-winding.

14. The device as recited in claim 13, wherein:

the intermediate area has two portions, a first portion being located on longitudinal sides, and another portion on transverse sides of the respective turn, given a rectangular implementation of each turn, the area difference is split up uniformly in the transverse direction and uniformly in the longitudinal direction, and a ratio of the first and the other portions correspond to a ratio of length to width of a rectangle.

15. The device as recited in claim 1, wherein:

the winding configuration has part-windings, one turn of a second part-winding is assigned to each turn of a first part-winding, each turn of the first part-winding has a number of cross-overs with the assigned turn of the second part-winding, and an area value of an area wrapped around in each case by the turn of the first part-winding is equal to an area value of an area wrapped around by the respective assigned turn of the second part-winding.

16. The device as recited in claim 15, wherein at least one of:

the first part-winding and the second part-winding are placed in such a way that, by an imaginary rotation through 180°, the first part-winding is transferable into the second part-winding, the first part-winding and the second part-winding are placed in such a way that, by rotation through 180°, the first part-winding is able to be made congruent with the second part-winding, a number of cross-overs is even, prior to a cross-over, the winding wire of the specific turn of the first part-winding runs inside of, and after the cross-over, outside of the respective assigned turn of the second part-winding prior to a cross-over, the winding wire of the specific turn of the first part-winding runs outside of, and after the cross-over, inside of the respective assigned turn of the second part-winding, the cross-overs are set apart from each other at regular intervals in the direction of turn of a respective turn of at least one of the first part-winding and the second part-winding, a distance in at least one of a longitudinal direction and a transverse direction of the winding configuration, between one specific turn of the first part-winding and the respective assigned turn of the second part-winding is one of constant and increases monotonically from an outside toward a center, the part-windings are connected electrically in parallel to each other, the part-windings are each flat windings, and are windings disposed in a single area, the flat winding in each instance being disposed within a winding area, the winding area running especially in curved fashion, with the exception of at least one of the regions of the cross-over and the regions where the winding-wire end areas are brought out, the part-windings are flat windings, litz wire is used as winding wire, the litz wire taking the form of a bundle of individual wires electrically insulated from each other, and the litz wire is round litz wire, the bundle having essentially a round cross-section.

17. A system for a non-contact transmission of energy to an electric-powered vehicle, comprising:

a device that includes:
 a cover part,
 a winding carrier,
 a winding configuration accommodated in the winding carrier,
 a ferrite layer including openings,
 a support,
 a base part, and
 support domes formed in one piece on the base part, wherein:
  the support domes protrude through the openings in the ferrite layer and support at least one of the winding carrier and the cover part, the winding carrier is disposed between the cover part and the ferrite layer, and the ferrite layer is mounted on the support that is situated on the base part;

an alternating-current source; and the vehicle, wherein:

an alternating current from the alternating-current source is injectable into the winding configuration, and the vehicle on a bottom side includes a secondary winding that is able to be coupled inductively to the winding configuration.

18. The system as recited in claim 17, wherein the system is a charging station.

19. The system as recited in claim 17, wherein the winding configuration includes part-windings that are connected in parallel to each other.

* * * * *